United States Patent
Yoshida et al.

(10) Patent No.: US 7,940,626 B2
(45) Date of Patent: May 10, 2011

(54) RECORDING DEVICE AND RECORDING METHOD, AND COMPUTER PROGRAM

(75) Inventors: Masayoshi Yoshida, Saitama (JP); Masahiro Kato, Saitama (JP); Tsuyoshi Hasebe, Saitama (JP); Takeshi Koda, Saitama (JP); Keiji Katata, Saitama (JP)

(73) Assignee: Pioneer Corporation, Tokyo (JP)

( * ) Notice: Subject to any disclaimer, the term of this patent is extended or adjusted under 35 U.S.C. 154(b) by 1145 days.

(21) Appl. No.: 11/597,187

(22) PCT Filed: Jan. 13, 2006

(86) PCT No.: PCT/JP2006/300371
§ 371 (c)(1),
(2), (4) Date: Jan. 19, 2007

(87) PCT Pub. No.: WO2006/075701
PCT Pub. Date: Jul. 20, 2006

(65) Prior Publication Data
US 2010/0014400 A1  Jan. 21, 2010

(30) Foreign Application Priority Data
Jan. 14, 2005 (JP) .................. 2005-008446

(51) Int. Cl.
*G11B 7/00* (2006.01)
(52) U.S. Cl. ............ 369/59.25; 369/94; 369/47.53
(58) Field of Classification Search .......... None
See application file for complete search history.

(56) References Cited

U.S. PATENT DOCUMENTS
7,068,578 B2 *  6/2006  Matsuba ............. 369/53.24
2005/0013222 A1 *  1/2005  Lee et al. ........... 369/47.51

FOREIGN PATENT DOCUMENTS
| EP | 1 607 971 | 12/2005 |
| JP | 2004-310974 | 11/2004 |
| JP | 2005-327385 | 11/2005 |
| WO | WO 02/41304 | 5/2002 |
| WO | WO 2005/001824 | 1/2005 |

* cited by examiner

Primary Examiner — Joseph Haley
(74) Attorney, Agent, or Firm — Young & Thompson

(57) ABSTRACT

A recording apparatus includes: a recording device for recording record information onto at least one of (i) a recording medium including: a first recording layer and a second recording layer in which the record information is recorded by irradiating laser light thereon, each of the first and second recording layers including a buffer area and a calibration area, and (ii) a recording medium including: the first recording layer and the second recording layer, each of the first and second recording layers including the calibration area; a setting device for setting a reserved area having a predetermined size for extending or generating the buffer area, by each recording unit in the calibration area; a calibrating device for calibrating the power by using the calibration area other than the set reserved area; and a controlling device for controlling the recording device to record the record information into at least the reserved area.

8 Claims, 9 Drawing Sheets

RECORDING DEVICE AND RECORDING METHOD, AND COMPUTER PROGRAM

TECHNICAL FIELD

The present invention relates to a recording apparatus, such as a DVD recorder, a recording method, and a computer program which makes a computer function as the recording apparatus.

BACKGROUND ART

There has been used a recording medium, such as a DVD, capable of readily recording content data, such as video images and audio, and other various data. Moreover, in order to record the content data and the other various data with a larger data amount into one recording medium, there has been developed a dual-layer type recording medium on which two recording layers are laminated, which is already commercialized in some field.

In order to preferably record the content data and the other various data with a larger data amount into such a recording medium, it is necessary to calibrate the power of laser light, which is irradiated to record the data. The power calibration is performed by recording an OPC pattern into a PCA (Power Calibration Area), an IDTA (Inner Disc Testing Area), an ODTA (Outer Disc Testing Area), or the like. The process related to the power calibration is generally referred to as OPC (Optimum Power Control).

On the other hand, in the dual-layer type recording medium, a middle area for preventing the runaway of an optical pickup which irradiates the laser light is generated immediately before the ODTA located on the outer circumferential side, at the time of finalize process.

DISCLOSURE OF INVENTION

Subject to be Solved by the Invention

The middle area needs to have a certain size or larger size than the certain size, in order to preferably prevent the runaway of the optical pickup. However, there is the ODTA located on the outer circumferential side of the middle area, so that there is such a technical problem that the middle area cannot be easily extended. This is the same for a lead-in area and a lead-out area, which is different from the middle area.

It is therefore an object of the present invention to provide a recording apparatus and a recording method, which can preferably form a middle area of a certain size or larger size than the certain size, for example, as well as a computer program.

Means for Solving the Subject (Recording Apparatus)

The above object of the present invention can be achieved by a recording apparatus provided with: a recording device for recording record information onto at least one of (i) a recording medium provided with: a first recording layer and a second recording layer in which the record information is recorded by irradiating laser light thereon, each of the first recording layer and the second recording layer provided with a buffer area (e.g. a middle area, a lead-in area, or a lead-out area, described later) for preventing malfunction of the recording apparatus and a calibration area (e.g. an IDTA and an ODTA, described later) for calibrating a power of the laser light which is used in recording the record information, and (ii) a recording medium provided with: the first recording layer and the second recording layer, each of the first recording layer and the second recording layer provided with the calibration area; a setting device for setting a reserved area having a predetermined size, for extending or generating the buffer area by each recording unit in the calibration area; a calibrating device for calibrating the power by using the calibration area other than the set reserved area; and a controlling device for controlling the recording device to record the record information into at least the reserved area.

According to the recording apparatus of the present invention, by the operation of the recording device, it is possible to record the record information into each of the first recording layer and the second recording layer. The record information is recorded into each recording layer by irradiating the laser light having a predetermined power, with focusing on the first recording layer or the second recording layer. Each of the first recording layer and the second recording layer is provided with the buffer area and the calibration area. The buffer area is provided to prevent the malfunction of the recording apparatus. For example, it is provided in order to buffer the operation of changing the recording layer into which the record information is recorded, or in order not to irradiate the laser light onto an unrecorded portion located following the buffer area. Namely, if the operation of changing the recording layer is performed while the buffer area is irradiated with the laser light, or if the laser light is not irradiated beyond the buffer area, it is possible to prevent the runaway of an optical disc for irradiating the laser light. Moreover, the calibration area is disposed adjacent to or close to the buffer area, for example, and it is used to calibrate (or adjust) the power of the laser light which is irradiated onto the recording medium when the record information is recorded. The power is calibrated by recording the record information for calibration into the calibration area. Alternatively, the buffer area is not necessarily provided in the initial condition before the recording operation starts. One portion of the recording medium may be allocated as the buffer area in the recording operation.

Particularly in the present invention, by the operation of the setting device, the reserved area for extending or newly generating the buffer area is set in the calibration area. The reserved area has the predetermined size. Preferably, the reserved area has a size of the recording area in which the address in the recording medium can be obtained. Then, by the operation of the calibrating device, the power of the laser light is calibrated by using the recording area, which is one portion of the calibration area, other than the reserved area set by the setting device. Then, for example, in the finalize process, the predetermined record information (e.g. dummy data or the like, described later) is recorded into at least the reserved area by the operation of the recording device under the control of the controlling device. Moreover, in the finalize process, the predetermined record information (e.g. dummy data or the like, described later) is also recorded into the buffer area. Moreover, the predetermined record information (e.g. dummy data or the like, described later) is also recorded into the recording area which is not used for the power calibration of the laser light, out of the calibration area. In other words, the record information is recorded, at least in the finalize process, in the entire recording area near the buffer area and the calibration area.

As described above, by the operation of the controlling device, the record information is also recorded into the recording area set as the reserved area. Moreover, the record information for calibration is recorded in the calibration area. Therefore, there is almost no recording area in which the record information is not recorded, in (or near) the calibration area located adjacent to or close to the buffer area. Namely, in the case of the optical disc, as one specific example of the recording medium, there is no recording area in a mirror condition, in the calibration area. Therefore, as a result, the calibration area can be regarded as the recording area having the same function as that of the buffer area. Therefore, it is possible to preferably provide the buffer area having a certain size or larger. In particular, in the case of the recording medium having the plurality of recording layers, the situation that the stability of the operation is difficult to ensure is assumed in the relatively small buffer area, due to the presence of an error in bonding each recording layer, an eccentric error, address offset in each recording layer, or the like. However, according to the present invention, the calibration area can be substantially used as the buffer area, so that it is possible to provide the extended buffer area of a certain size or larger. As a result, it is possible to ensure the stability of the operation, more preferably.

In addition, the reserved area in which the record information for calibration is not recorded is set in one portion of the calibration area. Therefore, even after the record information is recorded into the reserved area in the finalize process, for example, it is possible to preferably read control information, such as sector ID in the reserved area. If the reserved area is not provided, the record information for calibration recorded in the calibration area interferes with the record information recorded in the finalize process, for example, so that a preferable reproduction signal cannot be obtained in the calibration area. As a result, it is difficult or impossible to read the control information, such as the sector ID. Such a situation is notable on a reproducing apparatus which uses a different tracking method, and it is not preferable from the viewpoint of ensuring the stable operation. However, according to the present invention, one portion of the calibration area is set as the reserved area at the stage of the recording operation. Thus, at least in the reserved area, the disadvantage of the data interference does not occur even after the record information is recorded in the finalize process, for example. As a result, it is possible to preferably read the sector ID.

As explained above, according to the recording apparatus in the present invention, it is possible to preferably generate the buffer area of a certain size or larger, and it is also possible to preferably ensure the stability of the subsequent operation of the reproducing apparatus.

In one aspect of the recording apparatus of the present invention, the controlling device controls the recording device to record the record information to which a buffer area attribute indicating that it functions as the buffer area is appended, into at least the reserved area.

According to this aspect, it is possible to use the reserved area (moreover, the calibration area) as the buffer area. As a result, it is possible to preferably generate the buffer area of a certain size or larger.

In another aspect of the recording apparatus of the present invention, the predetermined size is the smallest unit in which an address appended to the recording medium can be obtained.

According to this aspect, the reserved area having the size of the smallest unit capable of obtaining the address is set. Therefore, it is unnecessary to set the unnecessarily large reserved area. Thus, the capacity of the calibration area which can be used for the calibration of the laser light is not greatly reduced. On the other hand, even after the record information is recorded in the finalize process, for example, it is possible to preferably read the sector ID from the reserved area after the record information is recorded. Therefore, particularly, it is possible to preferably ensure the stability of the operation of the reproducing apparatus.

In another aspect of the recording apparatus of the present invention, the recording unit in the calibration area is an ECC block, and the predetermined size is at least one sector.

According to this aspect, the capacity of the calibration area which can be used for the calibration of the laser light is not greatly reduced. On the other hand, even after the record information is recorded in the finalize process, for example, it is possible to preferably read the sector ID from the reserved area after the record information is recorded. Therefore, particularly, it is possible to preferably ensure the stability of the operation of the reproducing apparatus.

In another aspect of the recording apparatus of the present invention, the recording unit in the calibration area is an ECC block, and the predetermined size is at least three sectors.

According to this aspect, the capacity of the calibration area which can be used for the calibration of the laser light is not greatly reduced. On the other hand, even after the record information is recorded in the finalize process, for example, it is possible to preferably read the sector ID from the reserved area after the record information is recorded. Therefore, particularly, it is possible to preferably ensure the stability of the operation of the reproducing apparatus.

In another aspect of the recording apparatus of the present invention, the setting device sets the reserved area having the predetermined size, starting from a start edge portion of the recording unit in the calibration area.

According to this aspect, it is possible to set the reserved area on the edge portion of the recording unit of the calibration area (e.g. the recording unit having the size of 1ECC block). Therefore, it is easier to record the record information for calibration, as compared to the case where the reserved area is set except the edge portion of the calibration area.

In another aspect of the recording apparatus of the present invention, the controlling device controls the recording device to record the record information into the entire calibration area.

According to this aspect, it is unnecessary to selectively record the record information into the reserved area. Namely, if the record information is continuously recorded on the outer circumferential side of the buffer area in the initial setting, it is possible to extend the buffer area. Therefore, it is possible to reduce the processing load of the recording apparatus, and it is also possible to extend the buffer area, relatively easily.

In another aspect of the recording apparatus of the present invention, the buffer area is at least one of a lead-in area, a lead-out area, and a middle area.

According to this aspect, it is possible to preferably generate the lead-in area, the lead-out area, and the middle area, which have a certain size or larger. As a result, it is possible to preferably ensure the stability of the operation of the reproducing apparatus.

(Recording Method)

The above object of the present invention can be also achieved by a recording method provided with: a first recording process of recording record information onto at least one of (i) a recording medium provided with: a first recording layer and a second recording layer in which the record information is recorded by irradiating laser light thereon, each of the first recording layer and the second recording layer provided with a buffer area for preventing malfunction of a recording apparatus and a calibration area for calibrating a power of the laser light which is used in recording the record information, and (ii) a recording medium provided with: the first recording layer and the second recording layer, each of the first recording layer and the second recording layer provided with the calibration area; a setting process of setting a reserved area having a predetermined size, used in extending or generating the buffer area by each recording unit in the calibration area; a calibrating process of calibrating the power by using the calibration area other than the set reserved area; and a second recording process of recording the record information into at least the reserved area.

According to the recording method of the present invention, it is possible to receive the same various benefits as those owned by the recording apparatus of the present invention described above.

Incidentally, in response to various aspects of the recording apparatus of the present invention described above, the recording method of the present invention can also adopt various aspects.

(Computer Program)

The above object of the present invention can be also achieved by a computer program for recording control to control a computer provided in the above-mentioned recording apparatus of the present invention (including its various aspects), to make the computer function as at least one portion of the recording apparatus (specifically, at least one of the setting device, the calibrating device, and the controlling device).

According to the computer program of the present invention, the above-mentioned recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned recording apparatus of the present invention, the computer program of the present invention can adopt various aspects.

The above object of the present invention can be also achieved by a computer program product in a computer-readable medium for tangibly embodying a program of instructions executable by a computer provided in the above-mentioned recording apparatus of the present invention (including its various aspects), to make the computer function as at least one portion of the recording apparatus (specifically, at least one of the setting device, the calibrating device, and the controlling device).

According to the computer program product of the present invention, the above-mentioned recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-mentioned recording apparatus of the present invention.

These effects and other advantages of the present invention will become more apparent from the following embodiment.

As explained above, the recording apparatus of the present invention is provided with the recording device, the setting device, the calibrating device, and the controlling device. The recording method of the present invention is provided with the first recording process, the setting process, the calibrating process, and the second recording process. Therefore, it is possible to preferably generate the middle area or the like of a certain size or larger.

DESCRIPTION OF REFERENCE CODES

100 Optical disc
102 Lead-in area
103*a*, 113*a* IDTA
103*b*, 113*b* ODTA
103*c*, 113*c* flexible ODTA
118 Lead-out area
109, 119 Initial middle area
110, 120 Shifted middle area
200 Recording/reproducing apparatus
352 Optical pickup
353 Signal recording/reproducing device
354, 359 CPU
355, 360 Memory

BEST MODE FOR CARRYING OUT THE INVENTION

Hereinafter, the best mode for carrying out the invention will be explained in each embodiment in order, with reference to the drawings.

(Embodiment of Recording Medium)

Figure 1:
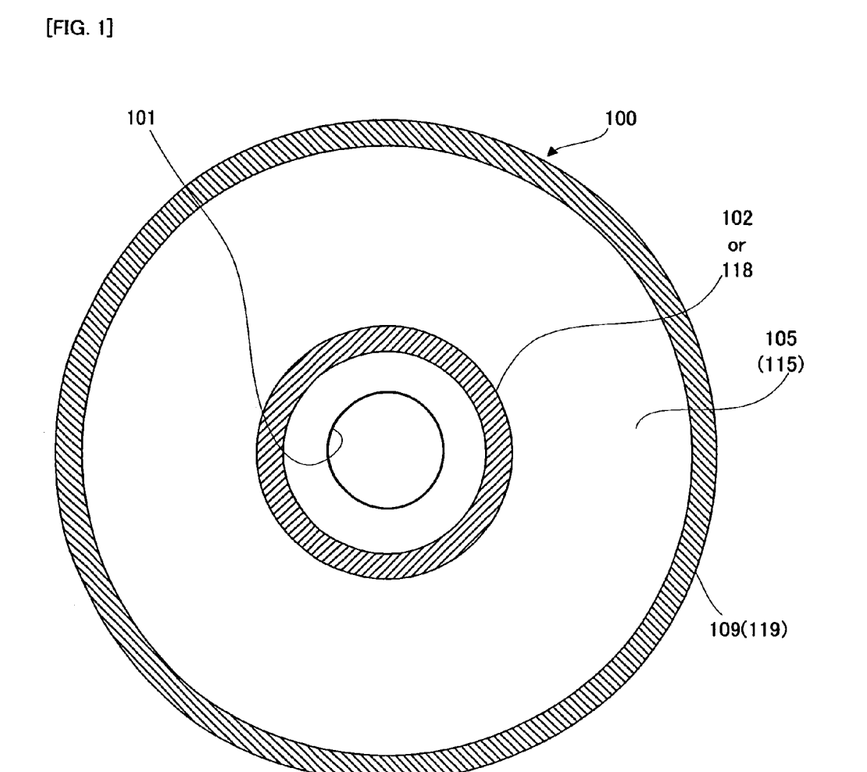
FIG. 1 is a substantial plan view showing the basic structure of an optical disc in an embodiment.
Figure 2:
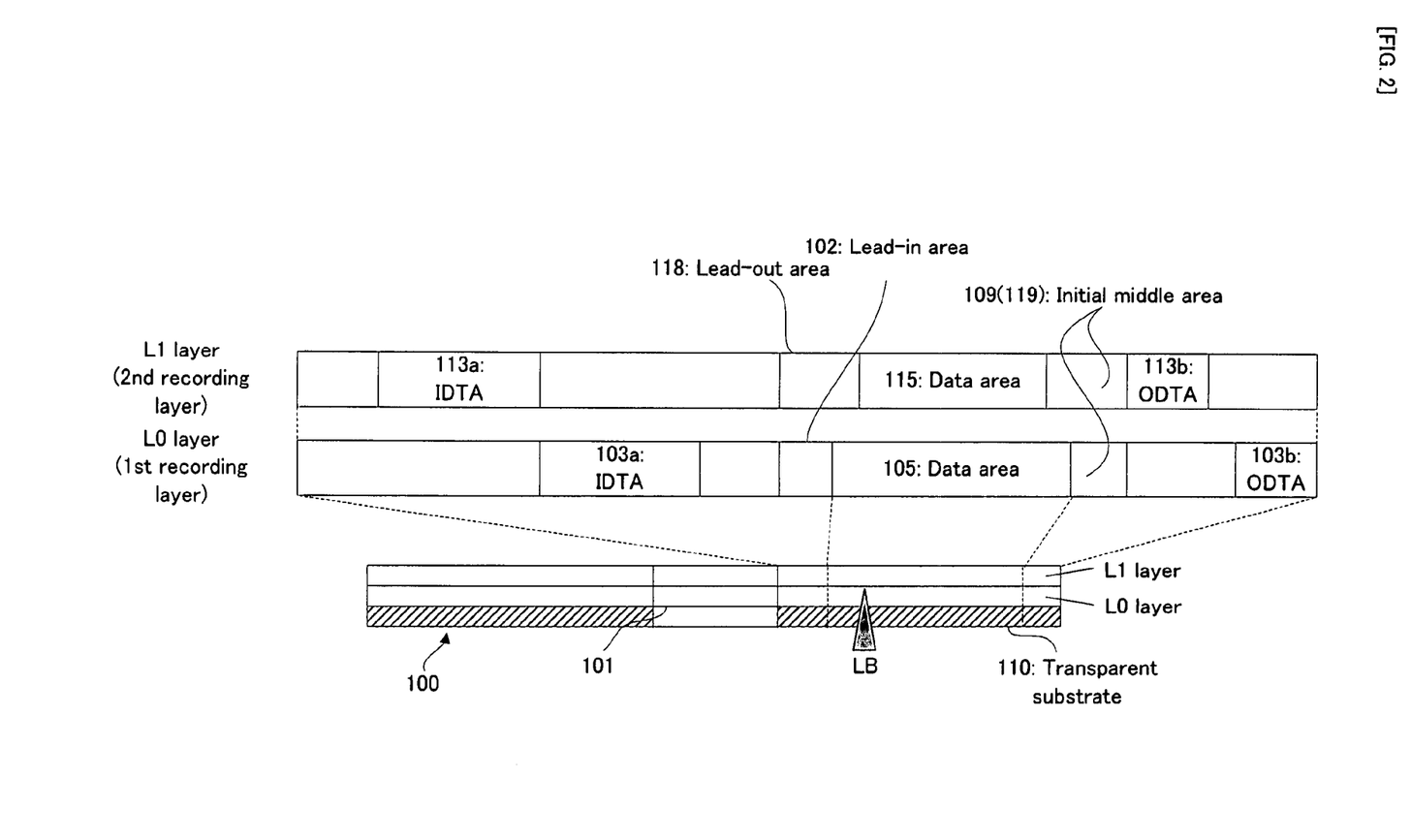
FIG. 2 is a substantial cross sectional view showing the optical disc in the embodiment, and a corresponding conceptual view showing a recording area structure in the radial direction.

Firstly, with reference to FIG. 1 and FIG. 2, an explanation will be given for the basic structure of an optical disc as a recording medium onto which data is recorded by an embodiment of the recording apparatus of the present invention. FIG. 1 is a substantial plan view showing the basic structure of an optical disc 100 in the embodiment. FIG. 2 are a substantial cross sectional view showing the optical disc in the embodiment, and a corresponding conceptual view showing a recording area structure in the radial direction.

As shown in FIG. 1, the optical disc 100 has a recording surface on a disc main body with a diameter of about 12 cm, as is a DVD. On the recording surface, the optical disc 100 is provided with: a center hole 101 as being the center; a lead-in area 102 or a lead-out area 118; data areas 105 and 115; and initial middle areas 109 and 119. Then, in the optical disc 100, recording layers or the like are laminated on a transparent substrate 110, for example. In each recording area of the recording layers, a track or tracks, such as groove tracks and land tracks, are alternately placed, spirally or concentrically, centered on the center hole 101. Moreover, on the track, data is divided and recorded by a unit of ECC block. The ECC block is a data management unit by which the record information can be error-corrected. Incidentally, the lead-in area 102, the lead-out area 118, and the initial middle area 109 (119) constitute one specific example of the "buffer area" of the present invention.

Incidentally, the present invention is not particularly limited to the optical disc having the three areas as described above. For example, even if the lead-in area 102, the lead-out area 118, or the middle area 109 (119) does not exist, a data structure and the like explained below can be constructed. Moreover, as described later, the lead-in area 102 and the lead-out area 118 or the middle area 109 (119) may be further segmentized.

Particularly, the optical disc 100 in the embodiment, as shown in FIG. 2, has such a structure that an L0 layer and an L1 layer are laminated on the transparent substrate 110. Upon the recording and reproduction of such a dual-layer type optical disc 100, the data recording/reproduction in the L0 layer or the L1 layer is performed, depending on which recording layer has the focus position of laser light LB, irradiated from the lower side to the upper side in FIG. 2. In particular, in the L0 layer, the data is recorded from the inner to the outer circumferential side, whereas in the L1 layer, the data is recorded from the outer to the inner circumferential side. In other words, the optical disc 100 in the embodiment corresponds to an optical disc in an opposite track path method. Even an optical disc in a parallel track path method can also receive various benefits described later, by adopting a structure discussed below.

The optical disc 100 in the embodiment is provided with: IDTA (Inner Disc Testing Area) 103*a* (113*a*) on the inner circumferential side of the lead-in area 102 and the lead-out area 118; and ODTA (Outer Disc Testing Areas) 103*b* (113*b*) on the outer circumferential side of the initial middle areas 109 (119).

The IDTA 103*a* (113*a*) and the ODTA 103*b* (113*b*), which constitute one specific example of the "calibration area" of the present invention, are recording areas to perform therein an OPC (Optimum Power Control) process for adjusting (calibrating) the laser power of the laser light LB when the data is recorded onto the optical disc 100. With a stepwise change in the laser power, an OPC pattern is recorded into the IDTA 103*a* (113*a*) or the ODTA 103*b* (113*b*), and the reproduction quality (e.g. asymmetry, etc.) of the recorded OPC pattern is measured, to thereby calibrate an optimum laser power (optimum recording laser power) when the data is recorded. In particular, the optimum laser power when the data is recorded into the recording area on the relatively inner circumferential side of the optical disc 100, is preferably calculated by recording the OPC pattern into the IDTA 103*a* (113*a*). Moreover, the optimum laser power when the data is recorded into the recording area on the relatively outer circumferential side of the optical disc 100, is preferably calculated by recording the OPC pattern into the ODTA 103*b* (113*b*).

Then, in order to preferably perform the OPC process without any influence of another recording layer, if the OPC process is performed by using the IDTA 113*a* or the ODTA 113*b* in the L1 layer, the OPC pattern is recorded by irradiating the laser light LB through the L0 layer in which the data is unrecorded. Of course, the same is true in the IDTA 103*a* or the ODTA 103*b* in the L0 layer. Thus, the IDTA 103*a* in the L0 layer and the IDTA 113*a* in the L1 layer are preferably not located in overlap positions, viewed from the irradiation side of the laser light LB. In the same manner, the ODTA 103*b* in the L0 layer and the ODTA 113*b* in the L1 layer are preferably not located in overlap positions, viewed from the irradiation side of the laser light LB.

However, particularly in the recording area in which the normal data is recorded, such as the data area 105 (115), of the optical disc 100, the data is recorded into the data area 115 in the L1 layer after the data is recorded into the data area 105 in the L0 layer, as a general rule. Namely, by irradiating the laser light LB through the data area 105 in the L0 layer in which the data is recorded, the data is recorded into the data area 115 in the L1 layer. The same is basically true in the other recording areas.

(Embodiment of Recording/Reproducing Apparatus)

Next, with reference to FIG. 3 to FIG. 9, the structure and operation of a recording/reproducing apparatus 200, as being an embodiment according to the recording apparatus of the present invention, will be explained.

(1) Basic Structure

Figure 3:
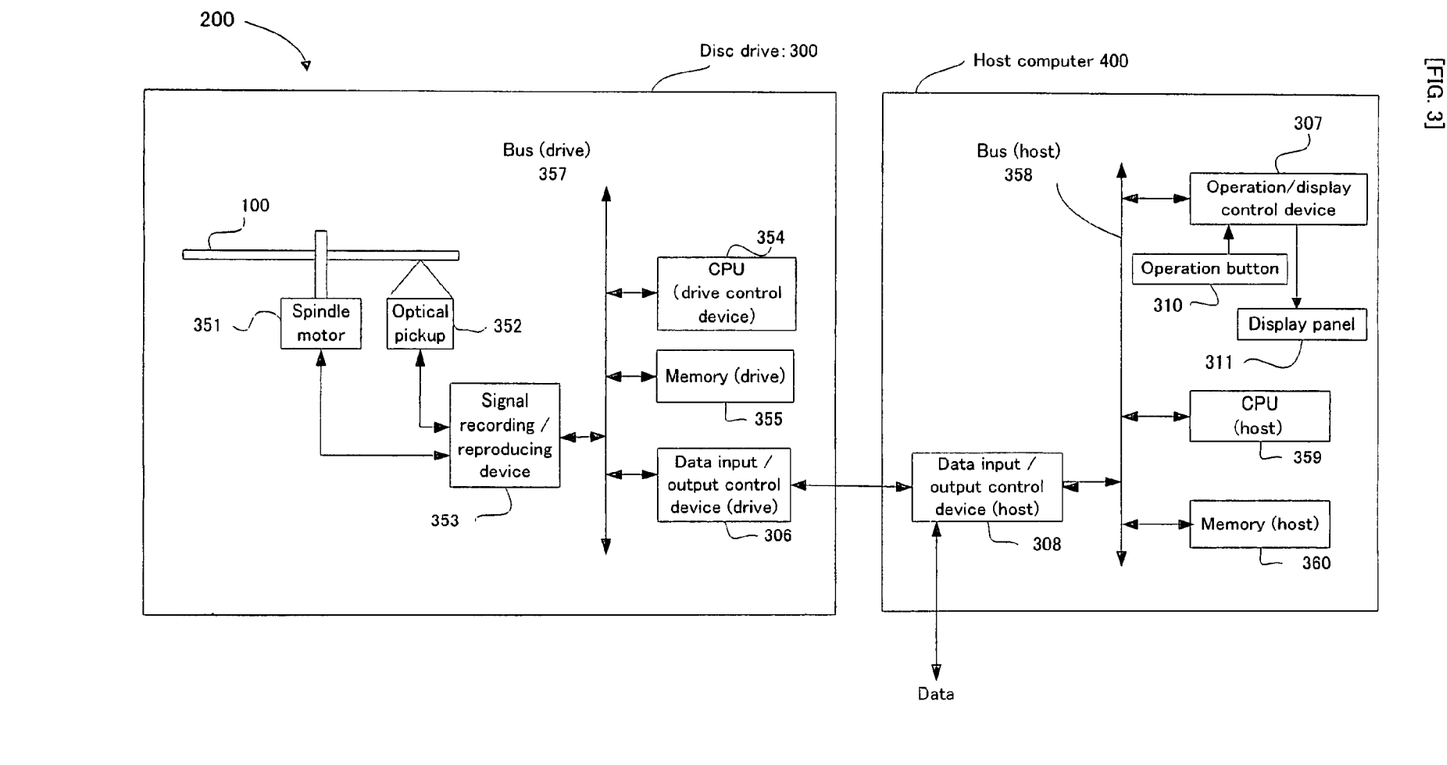
FIG. 3 is a block diagram conceptually showing the basic structure of a recording/reproducing apparatus in the embodiment.

Firstly, with reference to FIG. 3, the basic structure of the recording/reproducing apparatus 200 will be discussed. FIG. 3 is a block diagram conceptually showing the basic structure of the recording/reproducing apparatus 200 in the embodiment. Incidentally, the recording/reproducing apparatus 200 has a function of recording the data onto the optical disc 100 and a function of reproducing the data recorded on the optical disc 100.

As shown in FIG. 3, the recording/reproducing apparatus 200 is provided with: a disc drive 300 into which the optical disc 100 is actually loaded and in which the data is recorded and reproduced; and a host computer 400, such as a personal computer, for controlling the recording and reproduction of the data with respect to the disc drive 300.

The disc drive 300 is provided with: the optical disc 100; a spindle motor 351; an optical pickup 352; a signal recording/reproducing device 353; a CPU (drive control device) 354; a memory 355; a data input/output control device 306; and a bus 357. Moreover, the host computer 400 is provided with: a CPU 359; a memory 360; an operation/display control device 307; an operation button 310; a display panel 311; and a data input/output control device 308.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 constitutes one specific example of the "recording device" of the present invention and is provided with a semiconductor laser device, a lens, and the like, to perform the recording/reproduction with respect to the optical disc 100. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100. More specifically, the signal recording/reproducing device 353 is provided with: a laser diode (LD) driver; a head amplifier; and the like, for example. The laser diode driver (LD driver) drives a not-illustrated semiconductor laser device located in the optical pickup 352. The head amplifier amplifies the output signal of the optical pickup 352, i.e. the reflective light of a light beam, and outputs the amplified signal. More specifically, the signal recording/reproducing device 353 drives the not-illustrated semiconductor laser device located in the optical pickup 352, in order to determine an optimum laser power by the recording and reproduction processes for the OPC pattern, together with a not-illustrated timing generator or the like, under the CPU 354, upon the OPC process.

The memory 355 is used in the general data processing and the OPC process or the like on the disc drive 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like.

The CPU (drive control device) 354 is connected to the signal recording/reproducing device 353 and the memory 355 through the bus 357, and controls the entire disc drive 300 by giving an instruction to various controlling devices. Normally, software or firmware for operating the CPU 354 is stored in the memory 355.

The data input/output control device 306 controls the input/output of the data from the exterior with respect to the disc drive 300, to thereby perform storage to and export from the data buffer on the memory 355. A drive control command issued from the external host computer 400 connected to the disc drive 300 through an interface, such as a SCSI and an ATAPI, is transmitted to the CPU 354 through the data input/output control device 306. Moreover, the record/reproduction data is also exchanged with the host computer 400 through the data input/output control device 306, in the same manner.

The operation/display control device 307 receives an operation instruction and performs display with respect to the host computer 400, and transmits an instruction by the operation button 310, such as an instruction to record or reproduce, to the CPU 359. The CPU 359 may transmit a control command to the disc drive 300, through the data input/output control device 308, on the basis of instruction information from the operation/display control device 307, to thereby control the entire disc drive 300. In the same manner, the CPU 359 can transmit a command for requesting the disc drive 300 to transmit an operational state to the host, with respect to the disc drive 300. By this, the operational state of the disc drive 300, such as during recording and during reproduction, can be recognized, so that the CPU 359 can output the operational state of the disc drive 300 to the display panel 310, such as a fluorescent tube and an LCD, through the operation/display control device 307.

The memory 360 is an inner storage apparatus used by the host computer 400, and is provided with: a ROM area into which a firmware program, such as a BIOS (Basic Input/Output System), is stored; a RAM area into which a parameter required for the operation of an operating system and an application program or the like is stored; and the like. Moreover, the memory 360 may be connected to a not-illustrated external storage apparatus, such as a hard disk, through the data input/output control device 308.

One specific example used by combining the disc drive 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 360, on the CPU 359. Moreover, in another specific example, the disc drive 300 is a disc drive (hereinafter referred to as a "drive", as occasion demands), and the host computer 400 is a personal computer and a work station. The host computer, such as the personal computer, and the drive are connected through the data input/output control devices 306 and 308, such as the SCSI and the ATAPI, and application, such as writing software, installed in the host computer 400 controls the disc drive 300.

(2) Operation Principle

Figure 4:
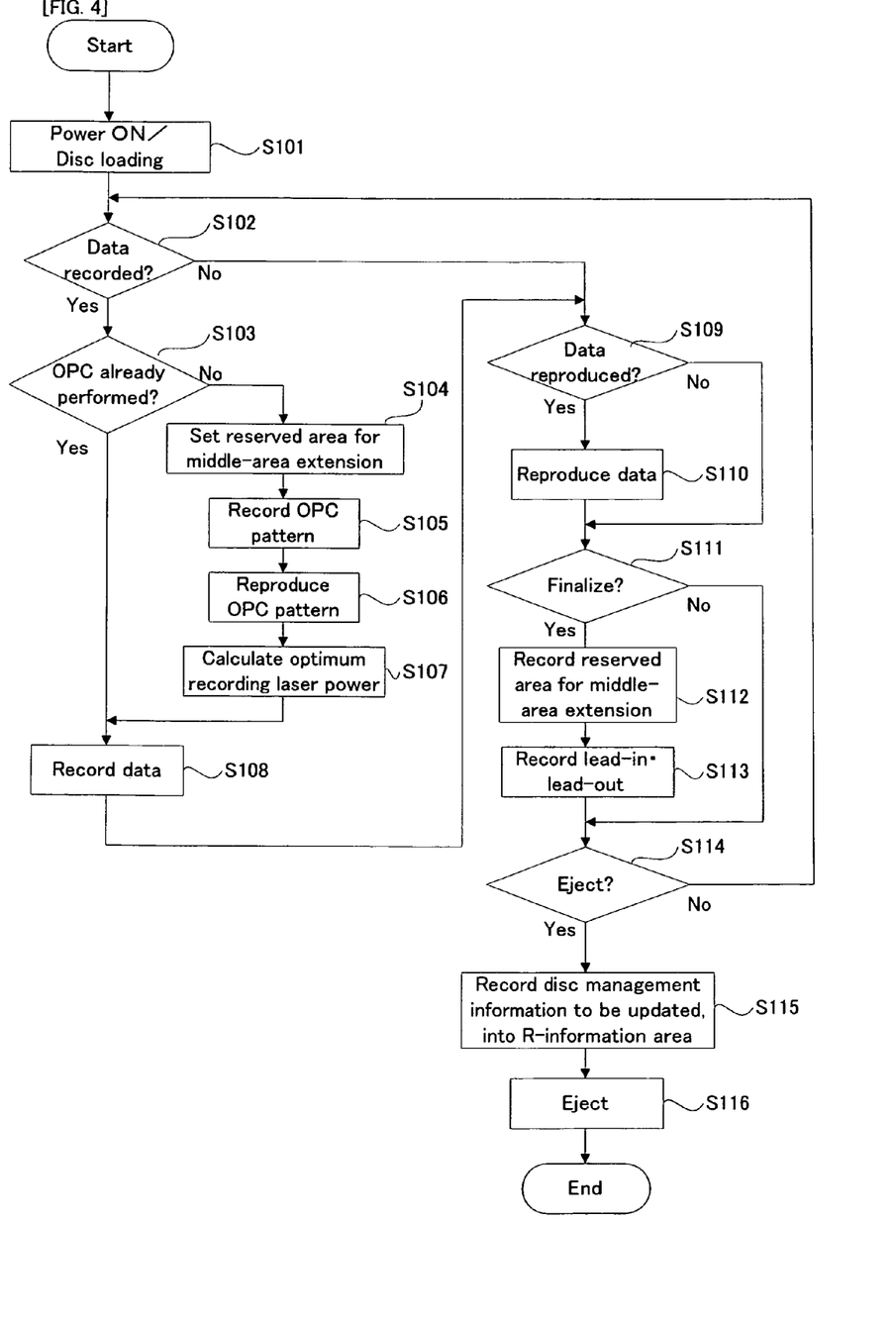
FIG. 4 is a flowchart conceptually showing a flow of the operation of the recording/reproducing apparatus in the embodiment.

Next, with reference to FIG. 4 to FIG. 8, the operation principle of the recording/reproducing apparatus 200 in the embodiment will be discussed. Here, the overall outline of the operation principle will be explained by using FIG. 4, and supplementary or more detailed explanation will be given by using FIG. 5 to FIG. 8. FIG. 4 is a flowchart conceptually showing a flow of the operation of the recording/reproducing apparatus 200 in the embodiment.

As shown in FIG. 4, firstly, the power of the recording/reproducing apparatus 200 is changed to ON, and then, the optical disc 100 is loaded onto the disc drive 300 (step S101). After this loading, various control data or management data necessary for the recording and the reproduction of the data or the like may be read. After that, it is judged whether or not the data is recorded onto the loaded optical disc 100 (step S102). For example, if a user gives an instruction to record the data by using an external remote controller, it may be judged that the data is recorded.

As a result of the judgment of the step S102, if it is judged that the data is not recorded (the step S102: No), the operational flow goes to a step S109. On the other hand, if it is judged that the data is recorded (the step S102: Yes), then, it is judged whether or not the OPC process is already performed (step S103).

As a result of the judgment of the step S103, if it is judged that the OPC process is already performed (the step S103: Yes), the data is recorded onto the optical disc 100 while the laser light LB is irradiated with the optimum recording laser power calculated by the OPC process already performed (step S108).

On the other hand, if it is judged that the OPC process is not performed yet (the step S103: No), the OPC process is performed. Incidentally, the ODTA 103*b* (113*b*) is focused in the explanation about the OPC process below. Firstly, under the control of the CPU 354, a reserved area for middle-area extension, is set in the ODTA 103*b* (113*b*), wherein the CPU 354 constitutes one specific example of the "setting device" of the present invention and the reserved area constitutes one specific example of the "reserved area" of the present invention (step S104). The OPC pattern is not recorded into the reserved area for middle-area extension, in the OPC process. Therefore, in the subsequent OPC process, the OPC pattern is recorded into the ODTA 103*b* (113*b*) other than the reserved area for middle-area extension, in the subsequent OPC process. After that, the OPC pattern is recorded into the ODTA 103*b* (113*b*) of the optical disc 100 (step S105).

Figure 5:
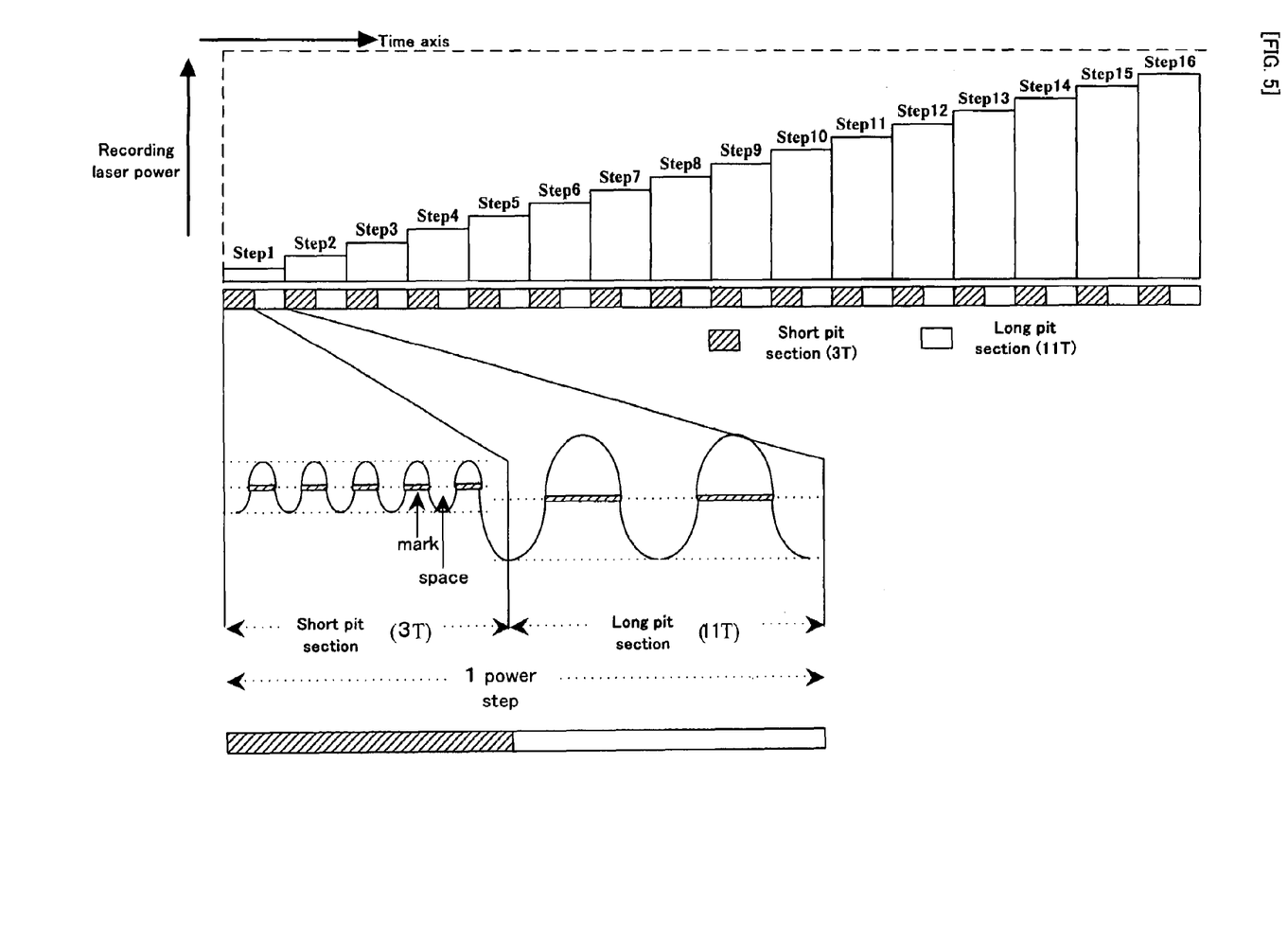
FIG. 5 is a schematic diagram conceptually showing an aspect of an OPC pattern.
Figure 6:
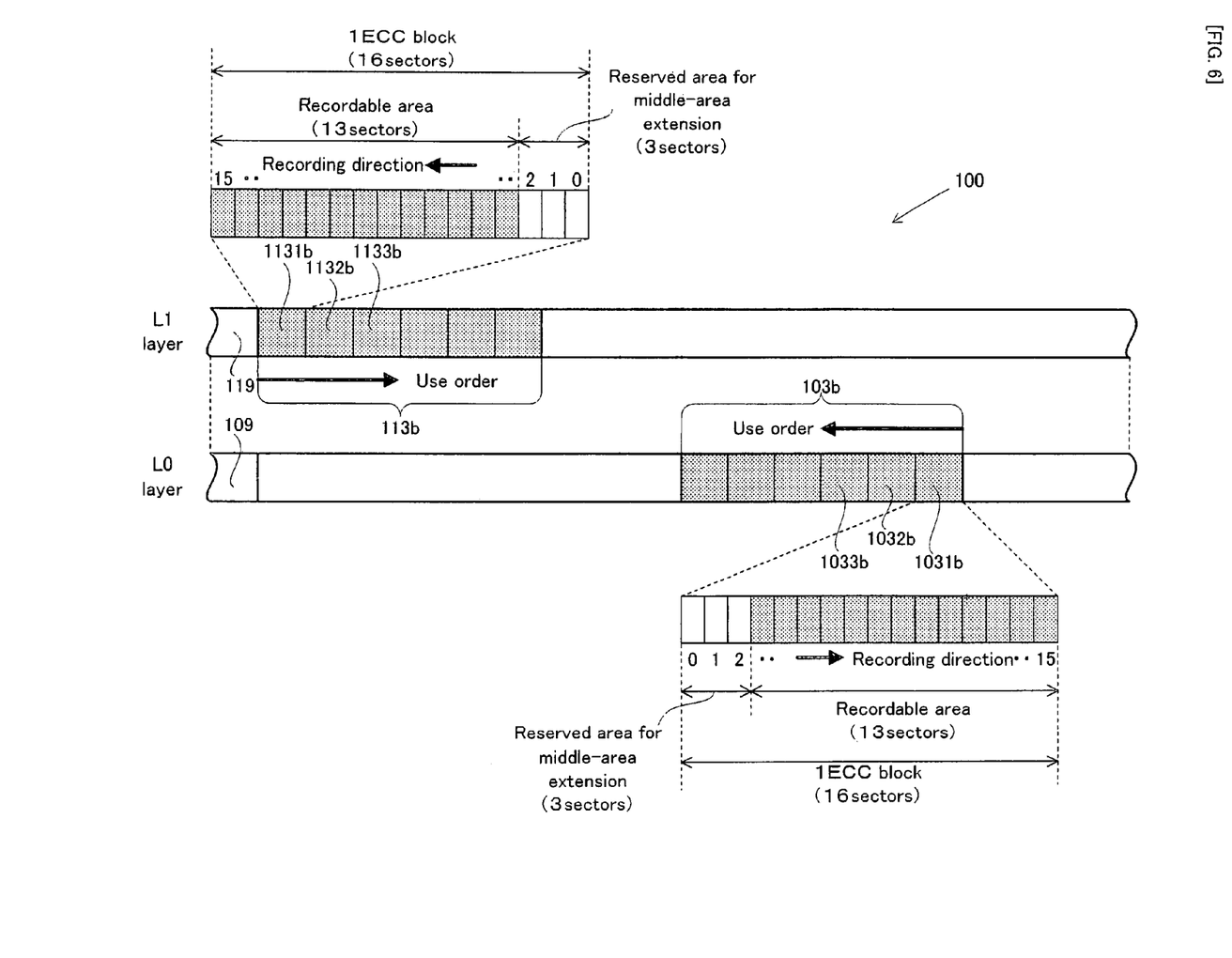
FIG. 6 is a data structure diagram conceptually showing an aspect in which the OPC pattern is actually recorded.

A more detailed explanation will be given to the setting of the reserved area for middle-area extension and the recording of the OPC pattern, with reference to FIG. 5 and FIG. 6. FIG. 5 is a schematic diagram conceptually showing an aspect of the OPC pattern. FIG. 6 is a data structure diagram conceptually showing an aspect in which the OPC pattern is actually recorded.

As shown in FIG. 5, for the OPC process, there is used the OPC pattern in which each of a short pit (mark) corresponding to a 3 T pulse and a long pit (mark) corresponding to an 11 T pulse is formed alternately with an unrecorded section (space) having the same length as that of the corresponding pit (mark), for example. Then, the OPC pattern is recorded while the recording laser power is changed in 16 steps from Step 1 to Step 16, for example.

As shown in FIG. 6, in the case of the L0 layer, for example, such an OPC pattern is recorded in order from the recording area portion on the outer circumferential side of the ODTA 103b. For example, firstly, the OPC pattern is recorded into a recording area portion 1031b, which is one portion of the ODTA 103b, and then, the OPC pattern is recorded into recording area portions 1032b and 1033b on the inner circumferential side in order. The size of each recording area portion is 1 ECC block, for example. In the recording area portion, the OPC pattern is recorded in order from the inner to the outer circumferential side, as in a direction of recording the data in the data area 105. On the other hand, in the case of the L1 layer, for example, the OPC pattern is recorded in order from the recording area portion on the inner circumferential side of the ODTA 113b. For example, the OPC pattern is recorded into a recording area portion 1131b, which is one portion of the ODTA 113b, and then, the OPC pattern is recorded into recording area portions 1132b and 1133b on the outer circumferential side in order. In the recording area portion, the OPC pattern is recorded in order from the outer to the inner circumferential side, as in a direction of recording the data in the data area 115.

Particularly in the embodiment, out of each recording area portion of the ODTA 103b (113b), first three sectors are set as the reserved area for middle-area extension. Namely, in each recording area portion, the 0 sector to the second sector are left in an unrecorded condition, and the OPC pattern is recorded into the third sector to the fifteenth sector, to thereby perform the OPC process. The reason is as follows.

In the initial middle area 109 (119) adjacent to or close to the ODTA 103b (113b), dummy data or the like (e.g. "00h" data etc., and the other control data to be recorded in the finalize process, etc.) is recorded in the finalize process, in order to provide reproduction compatibility with a read-only (reproduce-only) drive of the optical disc 100. At this time, in order to preferably prevent the operation from being out of control, caused by the optical pickup 351 jumping out to an unrecorded portion (i.e. the recording area in a mirror condition) in which the data is not recorded, it is necessary to record the dummy data or the like in a wider range than the initial middle area 109 (119). Thus, the dummy data or the like is recorded even into the ODTA 103b (113b) in which the OPC pattern is recorded. Even after the dummy data or the like is recorded, from the viewpoint of ensuring the stability of the operation of the recording/reproducing apparatus 200 (or the read-only drive), it is preferable to be able to read at least the sector ID or the like of the recording area portion in which the dummy data or the like is recorded. However, if the dummy data or the like is further recorded into the recording area portion in which the OPC pattern is recorded, recording pits on the optical disc 100 become dark (reflectance becomes low). As a result, there is a possibility that the data cannot be read. Thus, by setting at least three sectors, out of each recording are portion of the ODTA 103b (113b), as the reserved area for middle-area extension in which the OPC pattern is never recorded, the present invention is constructed such that the sector ID of the three sectors can be read even after the dummy data or the like is recorded.

In FIG. 4 again, then, the OPC pattern recorded in the step S105 is reproduced (step S106). Then, on the basis of the OPC pattern reproduced in the step S106, the optimum recording laser power when the data is recorded is calculated (step S107). More specifically, the peak value and the bottom value of envelope detection of a RF signal are sampled from the RF signal, wherein the RF signal is a reproduction signal of the OPC pattern inputted to a not-illustrated envelope detector. Then, from the peak value and the bottom value, asymmetry is calculated which is the reproduction quality of the OPC pattern. The reproduction of the OPC pattern (specifically, one pair of the 3 T mark and the 11 T space) and the measurement of the asymmetry are performed in one OPC process in accordance with the number of times of recording the record pattern (i.e. the number of the recording laser powers changed), for example. By this, it is possible to obtain a correlation between the recording laser power and the asymmetry. Then, on the basis of the correlation, the recording laser power which realizes the target asymmetry (i.e. in which the asymmetry is "0") is calculated as the optimum recording laser power. Incidentally, the recording and the reproduction of the OPC pattern, and the calculation of the optimum laser power, as explained above, are performed under the control of the CPU 354, which constitutes one specific example of the "calibrating device" of the present invention.

Then, under the control of the CPU 354, the various data is recorded into the data area 105 (115) while the laser light is irradiated with the optimum recording laser power calculated in the step S107 (step S108).

Then, it is judged whether or not the data recorded on the optical disc 100 is reproduced (step S109). For example, if a user gives an instruction to reproduce the data by using an external remote control, it may be judged that that the data is reproduced.

As a result of the judgment, if it is judged that the data is reproduced (the step S109: Yes), the data recorded on the optical disc 100 is read by irradiating the optical disc 100 with the laser light LB with a reproduction laser power, and after a signal process is performed, such as a demodulation process and a decoding process, the data is reproduced in video images, audio, or other various formats (step S110). On the other hand, if it is judged that the data is not reproduced (the step S109: No), the data is not reproduced.

Then, it is judged whether or not the finalize process is performed (step S111). Namely, it is judged whether or not to record the dummy data or the like into the lead-in area 102, the lead-out area 118 and the initial middle area 109 (119) such that the optical disc 100 into which the data newly recorded can be reproduced even by the read-only drive.

As a result of the judgment, if it is judged that the finalize process is performed (the step S111: Yes), the finalize process is performed on the optical disc 100. Specifically, firstly, under the control of the CPU 354 which constitutes one specific example of the "controlling device" of the present invention, the dummy data or the like with a middle area attribute is recorded into the reserved area for middle-area extension in which the OPC pattern is not recorded (step S112). At this time, the dummy data or the like with the middle area attribute may be further recorded (i.e. overwritten) into the ODTA 103b (113b) in which the OPC pattern is already recorded. Alternatively, the dummy data or the like with the middle area attribute may be selectively recorded into the reserved area for middle-area extension, by selectively excluding the ODTA 103b (113b) in which the OPC pattern is recorded. At this time, the dummy data or the like with the middle area attribute is also recorded into the initial middle are 109 (119). Moreover, the dummy data or the like with the middle area attribute is preferably recorded even into the ODTA 103b (113b), which is not the reserved area for middle-area extension and in which the OPC pattern is not recorded. Moreover, even in the recording area other than the initial middle area 109 (119) and the ODTA 103b (113b), the dummy data or the like with the middle area attribute is preferably recorded even into the recording area which is a predetermined distance away (e.g. about 0.4 mm or less), to the outer circumferential side, from the inner circumferential end edge of the initial middle area 109 (119). Then, in the lead-in area 102 (particularly, the unrecorded portion thereof), the dummy data or the like with a lead-in attribute is recorded. In the lead-out area 118 (particularly, the unrecorded portion thereof, the dummy data or the like with a lead-out attribute is recorded (step S113).

Incidentally, the dummy data or the like is not necessarily recorded in the finalize process. For example, if the recording operation of the recording/reproducing apparatus 200 is not influenced, the dummy data or the like may be recorded (i.e. pre-recorded) into a part or all of the lead-in area 102, the lead-out area 118, or the initial middle area 109 (119) before the finalize process even in the middle of the recording of the data into the data area 105 (115).

On the other hand, if it is judged that the finalize process is not performed (the step S111: No), the finalize process is not performed on the optical disc 100.

Figure 7:
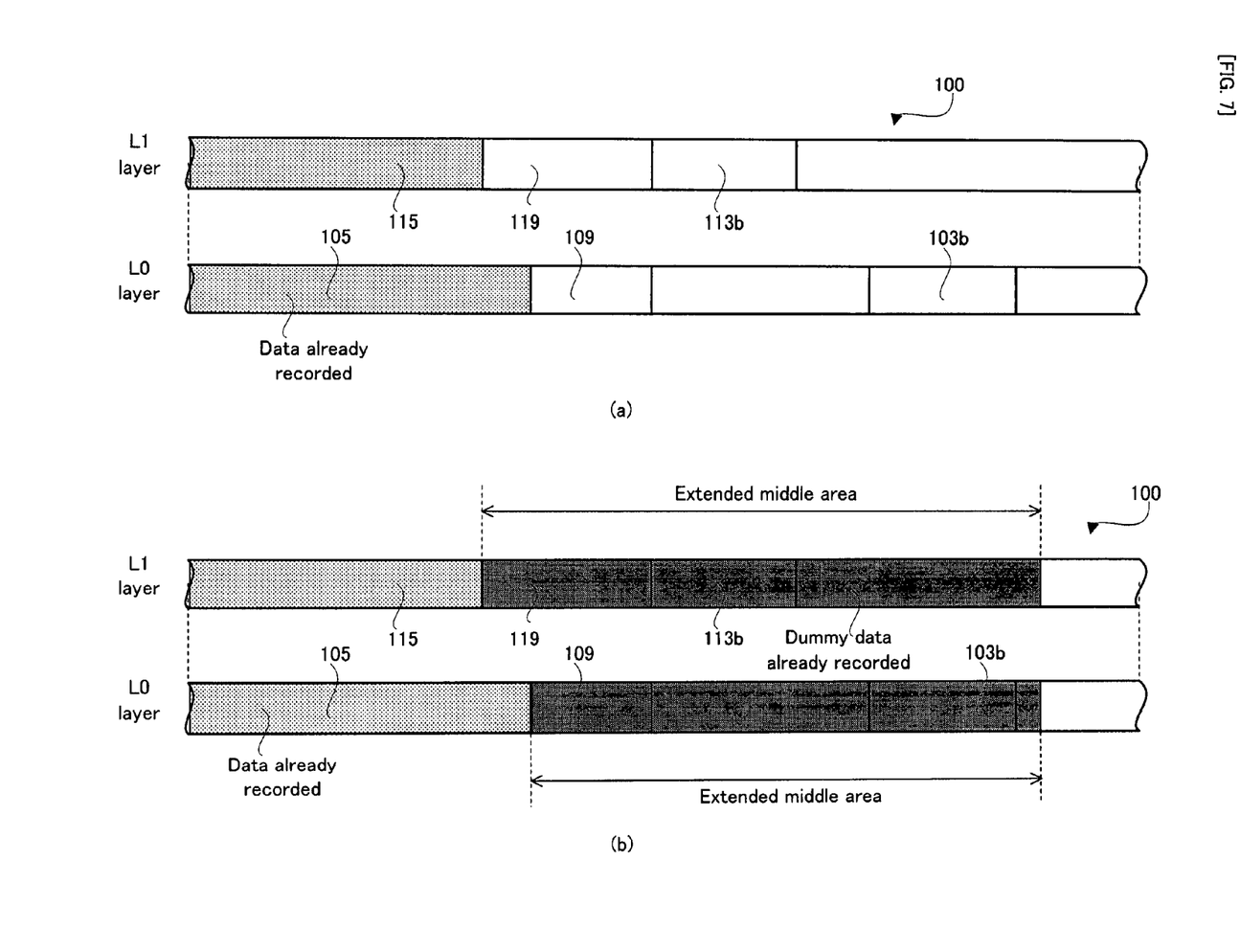
FIG. 7 are data structure diagrams conceptually showing one aspect of the recording of the data on the outer circumferential side of the optical disc in a finalize process.
Figure 8:
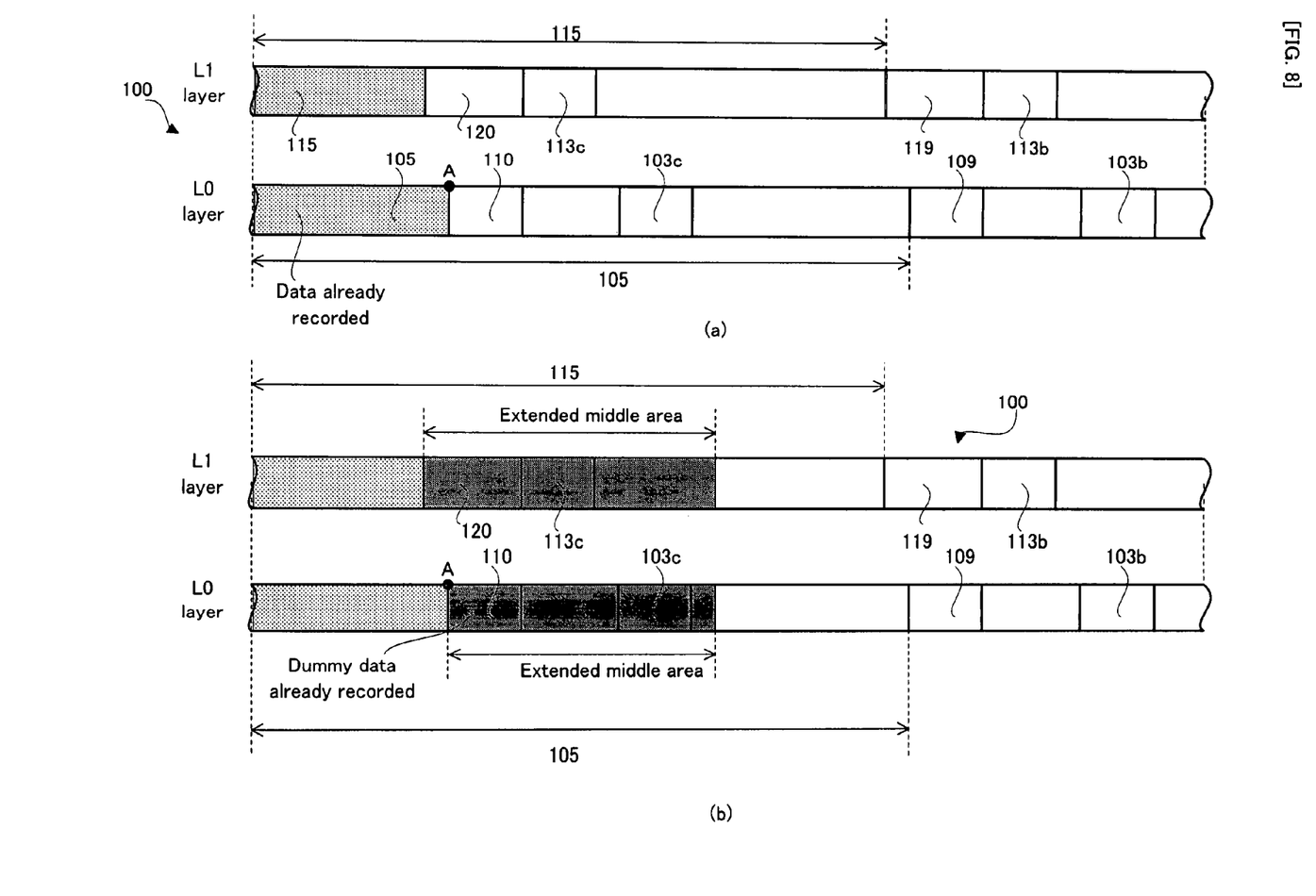
FIG. 8 are data structure diagrams conceptually showing another aspect of the recording of the data on the outer circumferential side of the optical disc in the finalize process.

Out of the finalize process, the recording operation of recording the dummy data or the like into the initial middle area 109 (119) will be explained in more detail, with reference to FIG. 7 and FIG. 8. FIG. 7 and FIG. 8 are data structure diagrams conceptually showing an aspect of the recording of the data onto the optical disc 100 (particularly, on the outer circumferential side of the optical disc 100) in the finalize process.

As shown in FIG. 7(a), the finalize process is performed after the data is recorded into the data area 105 (115). Incidentally, here, a hatching portion indicates a recording area in which predetermined data is recorded.

At this time, as described above, not only the dummy data or the like is merely recorded into the initial middle area 109 (119), but also the dummy data or the like is recorded into the recording area on the further outer circumferential side of the initial middle area 109 (119). Specifically, as shown in FIG. 7(b), the dummy data or the like is also recorded into the recording area on the further outer circumferential side including the ODTA 103b (113b) (particularly the reserved area for middle-area extension, and other unrecorded portions) in addition to the initial middle area 109 (119). At this time, it is preferable that the edge portion on the inner circumferential side of the recording area in the L0 layer in which the dummy data or the like is recorded, is about 0.4 mm or more away, in the radial direction, from the edge portion on the outer circumferential side of the recording area in the L1 layer in which the dummy data or the like is recorded. By recording the dummy data or the like as described above, as a result, an extended middle area larger than the initial middle area 109 (119) is formed on the outer circumferential side of the data area 105 (115), to thereby ensure the stability of the operation.

Moreover, the finalize process is not necessarily performed after the data is recorded into the entire data area 105 (115). For example, as shown in FIG. 8(a), the finalize process may be performed even if the data is recorded into the turn-around data area 115 after the data is recorded up to the middle of the data area 105 (e.g. with a point A as the end edge). At this time, a shifted middle area 110 (120) is formed to be adjacent to the edge portion on the outer circumferential side of the recording area in which the data is already recorded, out of the data area 105 (115), when the data is recorded into the turn-around data area 115. Moreover, a flexible ODTA 103c (113c) is formed on the further outer circumferential side of the shifted middle area 110 (120). A relationship between the shifted middle area 110 (120) and the flexible ODTA 103c (113c) is substantially the same as the relationship between the initial middle area 109 (119) and the ODTA 103b (113b) described above. Moreover, when the OPC pattern is recorded into the flexible ODTA 103c (113c), the reserved area for middle-area extension is obviously set, as described above.

After that, when the finalize process is performed, as shown in FIG. 8(b), the dummy data or the like is also recorded into the recording area on the further outer circumferential side including the flexible ODTA 103c (113c) (particularly the reserved area for middle-area extension, and other unrecorded portions) in addition to the shifted middle area 110 (120). Even by this, it is possible to ensure the stability of the operation, as in the case of FIG. 7(b).

In FIG. 4 again, after the finalize process in the step S111, it is judged whether or not the optical disc 100 is ejected from the disc drive 300 (step S114). For example, if a user gives an instruction to eject the optical disc 100 by using an external remote controller, it may be judged that the optical disc 100 is ejected.

As a result of the judgment, if it is judged that the optical disc 100 is ejected (the step S114: Yes), disc management information to be updated is recorded into an R-information area in the lead-in area 102 (step S115). After that, the optical disc 100 is ejected from the disc drive 300 (step S116). On the other hand, if it is judged that the optical disc 100 is not ejected (the step S114: No), the operational flow returns to the step S102 again, and the above-mentioned operations are repeated, as occasion demands.

As explained above, according to the recording/reproducing apparatus 200 in the embodiment, it is possible to generate the extended middle area of a certain size or larger, which is larger than at least the initial middle area. In particular, in the case of the optical disc 100 having the plurality of recording layers, the situation that the stability of the operation is difficult to ensure is assumed in the relatively small middle area, due to the presence of an error in bonding each recording layer, an error between the center of each recording layer and a rotation center position, address offset in each recording layer, or the like. However, according to the embodiment, the ODTA 103b (113b) can be substantially used as the middle area, so that it is possible to generate the extended middle area of a certain size or larger. As a result, it is possible to ensure the stability of the operation of the recording/reproducing apparatus 200, more preferably. In particular, in the reproduction of the optical disc 100 with the data recorded thereon by using a read-only reproducing apparatus which uses a different tracking method, it is possible to preferably ensure the stability of the operation.

In addition, the reserved area for middle-area extension in which the OPC pattern is not recorded, is set in one portion of the ODTA 103b (113b). Therefore, even after the dummy data or the like is recorded into the ODTA 103b (113b) in the finalize process, for example, it is possible to preferably read at least the control information, such as the sector ID, in the reserved area for middle-area extension. If the reserved area for middle-area extension is not provided, the OPC pattern recorded in the ODTA 103*b* (113*b*) interferes with the dummy data or the like recorded in the finalize process, so that the preferable reproduction signal cannot be obtained in the ODTA 103*b* (113*b*). As a result, it is difficult or impossible to read the control information, such as the sector ID. Such a situation is notable on the reproducing apparatus which uses a different tracking method, and it is not preferable. However, according to the embodiment, one portion of the ODTA 103*b* (113*b*) is set as the reserved area for middle-area extension at the stage of the recording operation. Thus, at least in the reserved area for middle-area extension, the disadvantage of the data interference does not occur even after the dummy data or the like is recorded in the finalize process, for example. As a result, it is possible to preferably read the sector ID. By this, particularly, even on the read-only reproducing apparatus which uses a different tracking method, it is possible to trace the ODTA 103*b* (113*b*) on which the finalize process is performed, so that it is possible to avoid the disadvantage of the runaway of the optical pickup. Namely, it is possible to preferably ensure the stability of the reproduction operation.

Figure 9:
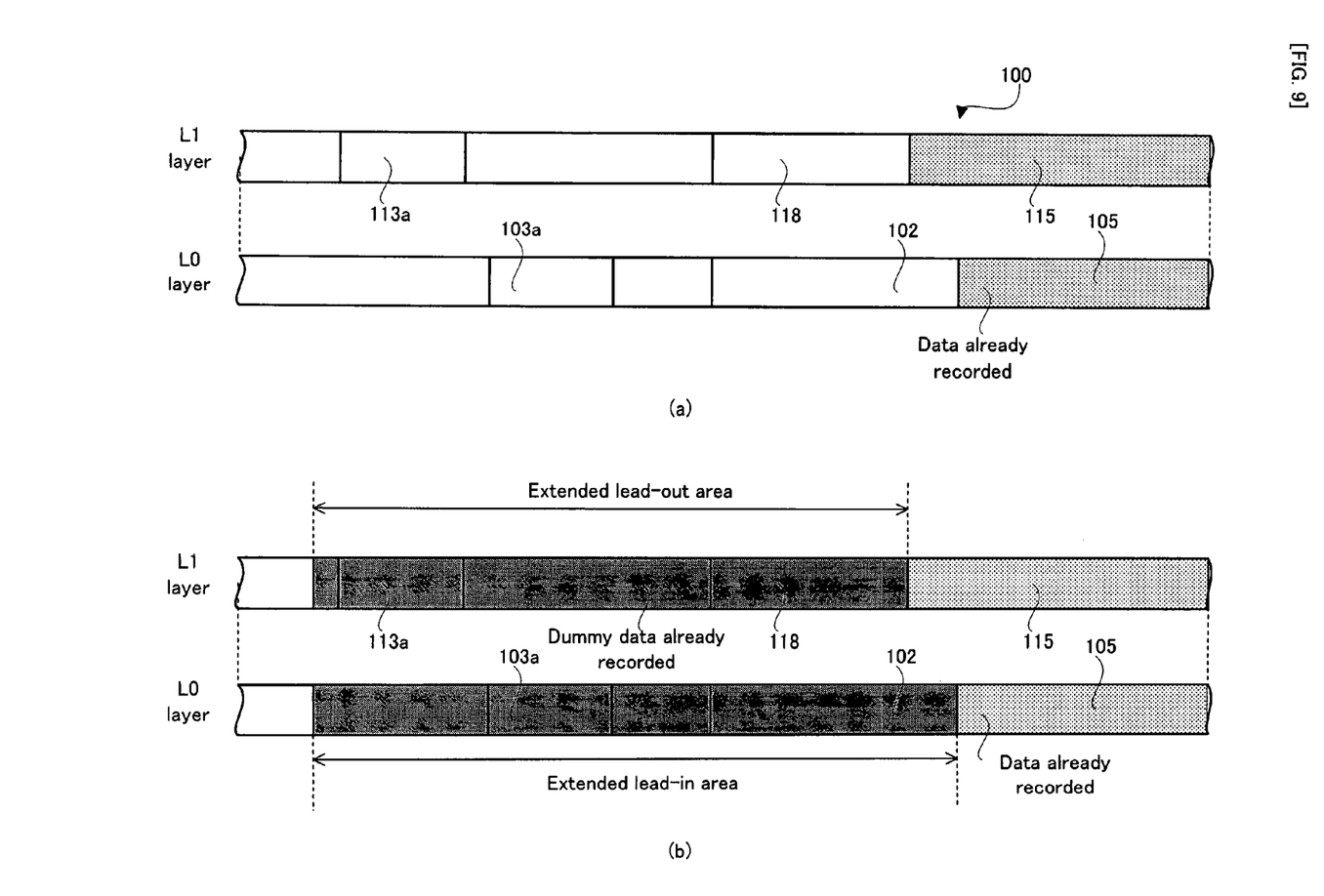
FIG. 9 are data structure diagrams conceptually showing another aspect of the recording of the data on the inner circumferential side of the optical disc in the finalize process.

Incidentally, the explanation was given for the initial middle area 109 (119) and the ODTA 103*b* (113*b*), or the shifted middle area 110 (120) and the flexible ODTA 103*c* (113*c*); however, the present invention is not limited to this. For example, the same is true for the lead-in area 102, the lead-out area 118, and the IDTA 103*a* (113*a*). Now, with reference to FIG. 9, an explanation is given for the case where the above-mentioned recording operation is applied to the lead-in area 102, the lead-out area 118, and the IDTA 103*a* (113*a*). FIG. 9 are data structure diagrams conceptually showing an aspect of the recording of the data onto the optical disc 100 (particularly, on the inner circumferential side of the optical disc 100) in the finalize process.

As shown in FIG. 9(*a*), the finalize process is performed after the data is recorded into the data area 105 (115). Incidentally, here, a hatching portion indicates a recording area in which predetermined data is recorded. Incidentally, when the OPC pattern is recorded into the IDTA 103*a* (113*a*), the reserved area for middle-area extension with three sectors is set in each 1 ECC block.

At this time, as described above, not only the dummy data or the like is merely recorded into the lead-in area 102 and the lead-out area 118, but also the dummy data or the like is recorded into the recording area on the further inner circumferential side of the lead-in area 102 and the lead-out area 118. Namely, the dummy data or the like is recorded into the lead-in area 102 and the lead-out area 118, as in the above-mentioned recording aspect in the case where the dummy data or the like is recorded into the initial middle area 109 (119). Specifically, as shown in FIG. 9(*b*), the dummy data or the like is also recorded into the recording area on the further inner circumferential side including the IDTA 103*a* (113*a*) (particularly the reserved area for middle-area extension, and other unrecorded portions) in addition to the lead-in area 102 and the lead-out area 118). By recording the dummy data or the like as described above, as a result, an extended lead-in area and an extended lead-out area, larger than the lead-in area and the lead-out area set in advance, are formed on the inner circumferential side of the data area 105 (115), to thereby ensure the stability of the operation.

As described above, it is also possible to receive the above-mentioned various benefits even in the lead-in area 102, the lead-out area 118, or the IDTA 103*a* (113*a*), or the like, located on the inner circumferential side of the optical disc 100.

Incidentally, in the above-mentioned embodiment, the reserved area for middle-area extension ensures three sectors in each 1 ECC block; however, the size of the reserved area for middle-area extension is not limited to this. Specifically, it is only necessary to have a size capable of obtaining the sector ID or the like from the reserved area for middle-area extension in the reproduction process system of the reproducing apparatus. Namely, if the sector ID or the like can be obtained from the reserved area for middle-area extension, the size of the reserved area for middle-area extension may be less than three sectors. Of course, it may be larger than three sectors. If the reserved area for middle-area extension is set larger than three sectors, it is possible to obtain the sector ID, more preferably and relatively easily. However, increasing the size of the reserved area for middle-area extension causes the reduction in size of the recording area to record the OPC pattern therein. Thus, it is preferable to set the reserved area for middle-area extension, as small as possible.

Moreover, in the above-mentioned embodiment, the optical disc 100 is explained as one example of the recording medium, and the recorder or player related to the optical disc 100 is explained as one example of the recording/reproducing apparatus. The present invention, however, is not limited to the optical disc and the recorder thereof, and can be applied to other various recording media, and the recorders or players thereof, which support high density recording or high transfer rate.

The present invention is not limited to the above-described embodiment, and various changes may be made, if desired, without departing from the essence or spirit of the invention which can be read from the claims and the entire specification. A recording apparatus, a recording method, and a computer program for recording control, which involve such changes, are also intended to be within the technical scope of the present invention.

INDUSTRIAL APPLICABILITY

The recording apparatus, the recording method, and the computer program according to the present invention can be applied to a high-density recording medium, such as a DVD, for example, and also applied to an information recording apparatus, such as a DVD recorder. Moreover, they can be applied to an information recording apparatus or the like, which is mounted on or can be connected to various computer equipment for consumer use or business use, for example.

The invention claimed is:

1. A recording apparatus comprising:
   a recording device for recording record information onto at least one of (i) a recording medium comprising: a first recording layer and a second recording layer in which the record information is recorded by irradiating laser light thereon, each of the first recording layer and the second recording layer comprising a buffer area for preventing malfunction of said recording apparatus and a calibration area for calibrating a power of the laser light which is used in recording the record information, and (ii) a recording medium comprising: the first recording layer and the second recording layer, each of the first recording layer and the second recording layer comprising the calibration area;
   a setting device for setting a reserved area having a predetermined size for extending or generating the buffer area, by each recording unit in the calibration area;
   a calibrating device for calibrating the power by using the calibration area other than the set reserved area; and
   a controlling device for controlling said recording device to record the record information into at least the reserved area, wherein said setting device sets the reserved area having the predetermined size, starting from a start edge portion of the recording unit in the calibration area.

2. The recording apparatus according to claim 1, wherein said controlling device controls said recording device to record the record information to which a buffer area attribute indicating that it functions as the buffer area is appended, into at least the reserved area.

3. The recording apparatus according to claim 1, wherein the predetermined size is the smallest unit in which an address appended to said recording medium can be obtained.

4. The recording apparatus according to claim 1, wherein the recording unit in the calibration area is an ECC block, and the predetermined size is at least one sector.

5. The recording apparatus according to claim 1, wherein said controlling device controls said recording device to record the record information into the entire calibration area.

6. The recording apparatus according to claim 1, wherein the buffer area is at least one of a lead-in area, a lead-out area, and a middle area.

7. A recording method comprising:
a first recording process of recording record information onto at least one of (i) a recording medium comprising: a first recording layer and a second recording layer in which the record information is recorded by irradiating laser light thereon, each of the first recording layer and the second recording layer comprising a buffer area for preventing malfunction of a recording apparatus and a calibration area for calibrating a power of the laser light which is used in recording the record information, and (ii) a recording medium comprising: the first recording layer and the second recording layer, each of the first recording layer and the second recording layer comprising the calibration area;
a setting process of setting a reserved area having a predetermined size, used in extending or generating the buffer area by each recording unit in the calibration area;
a calibrating process of calibrating the power by using the calibration area other than the set reserved area; and
a second recording process of recording the record information into at least the reserved area,
wherein said setting device sets the reserved area having the predetermined size, starting from a start edge portion of the recording unit in the calibration area.

8. A computer program product in a computer-readable medium for recording control for tangibly embodying a program of instructions executable by a computer provided in a recording apparatus, to make the computer function as at least one of a setting device, a calibrating device, and a controlling device,
said recording apparatus comprising:
a recording device for recording record information onto at least one of (i) a recording medium comprising: a first recording layer and a second recording layer in which the record information is recorded by irradiating laser light thereon, each of the first recording layer and the second recording layer comprising a buffer area for preventing malfunction of said recording apparatus and a calibration area for calibrating a power of the laser light which is used in recording the record information, and (ii) a recording medium comprising: the first recording layer and the second recording layer, each of the first recording layer and the second recording layer comprising the calibration area;
said setting device for setting a reserved area having a predetermined size for extending or generating the buffer area, by each recording unit in the calibration area;
said calibrating device for calibrating the power by using the calibration area other than the set reserved area; and
said controlling device for controlling said recording device to record the record information into at least the reserved area,
wherein said setting device sets the reserved area having the predetermined size, starting from a start edge portion of the recording unit in the calibration area.

* * * * *